United States Patent
Serban et al.

(10) Patent No.: US 6,927,734 B2
(45) Date of Patent: Aug. 9, 2005

(54) DIELECTRIC ROD ANTENNA

(75) Inventors: Gabriel M. Serban, North York (CA); Graham Fraser McGregor, Peterborough (CA)

(73) Assignee: Siemens Milltronics Process Instruments Inc., Ontario (CA)

( * ) Notice: Subject to any disclaimer, the term of this patent is extended or adjusted under 35 U.S.C. 154(b) by 22 days.

(21) Appl. No.: 10/672,235

(22) Filed: Sep. 25, 2003

(65) Prior Publication Data

US 2004/0113853 A1 Jun. 17, 2004

(30) Foreign Application Priority Data

Sep. 27, 2002 (CA) ............................................. 2405645

(51) Int. Cl.$^7$ .............................................. H01Q 13/00
(52) U.S. Cl. ...................... 343/703; 342/124; 324/644
(58) Field of Search ................. 343/703, 900, 343/901; 342/124; 324/644; H01Q 13/00

(56) References Cited

U.S. PATENT DOCUMENTS

| | | | |
|---|---|---|---|
| 6,097,346 A | | 8/2000 | Fehrenbach et al. |
| 6,155,112 A | * | 12/2000 | Eckert et al. ............. 73/290 V |
| 6,202,485 B1 | * | 3/2001 | Wien et al. ............... 73/290 R |
| 6,499,346 B1 | * | 12/2002 | Wien et al. ............... 73/290 R |
| 6,549,174 B2 | * | 4/2003 | Kloefer et al. .............. 343/786 |
| 6,825,798 B2 | * | 11/2004 | McGregor .................. 342/124 |

* cited by examiner

Primary Examiner—Hoanganh Le
(74) Attorney, Agent, or Firm—Merchant & Gould P.C.

(57) ABSTRACT

A dielectric rod antenna assembly for a level measurement system. The antenna assembly includes a transition structure housed within a coupling sleeve. The transition structure includes a short-circuited waveguide filled with a dielectric material and an exciter element projecting through the waveguide into the material. The transition structure directs electromagnetic energy through the bottom of the dielectric material into a rod antenna attached to the bottom of the coupling sleeve for propagation within the container. The dielectric material includes a longitudinal axial bore having a tapered tip to provide a dielectric-lined waveguide. The bottom end of the dielectric is encircled with a metal ring of a diameter larger than the dielectric to smooth the transition into the rod antenna.

26 Claims, 6 Drawing Sheets

DIELECTRIC ROD ANTENNA

FIELD OF THE INVENTION

The present invention relates to antennas, and more particularly to an antenna configuration for a radar-based level measurement instrument or time of flight ranging system.

BACKGROUND OF THE INVENTION

Time of flight ranging systems are commonly used in level measurement applications, and are referred to as level measurement systems. Level measurement systems determine the distance to a reflector, i.e. reflective surface, by measuring how long after transmission of energy pulses or waves, an echo is received. Such systems typically utilize ultrasonic pulses, pulse radar signals, or microwave signals.

Pulse radar and microwave-based level measurement systems are preferred in applications where the atmosphere in the container is subject to large temperature changes, high humidity, dust and other types of conditions which can affect propagation. To provide a sufficient receive response, a high gain antenna is typically used. High gain usually translates into a large antenna size.

Two types of antenna designs are typically found in microwave-based level measurement systems: rod antennas and horn antennas. Rod antennas have a narrow and elongated configuration and are suitable for containers having small opening/flange sizes and sufficient height for accommodating the antenna. Horn antennas, on the other hand, are wider and shorter than rod antennas. Horn antennas are typically used in installations with space limitations, for example, vessels or containers which are shallow.

The dielectric rod antennas used in microwave-based level measurement systems are intended for transmitting and receiving polarized microwaves with low crosspolarization in a large frequency bandwidth. Such antennas usually include a transition structure that introduces a propagating wave in a waveguide within the antenna assembly. The transition structure within the rod antenna assembly typically receives electromagnetic energy from a coaxial cable in which a TEM electromagnetic field is propagating. The energy propagates as a $TE_{11}$ electromagnetic field within the waveguide and, at the end of the waveguide, is converted into an $HE_{11}$ electromagnetic field. The $HE_{11}$ electromagnetic field mode propagates within the rod antenna and is launched into free space as a TEM electromagnetic field. A difficulty that arises is that waveguides that are efficiently designed for propagating the fundamental $TE_{11}$ mode often also propagate the upper $TM_{01}$ mode. The $TM_{01}$ mode is coupled from the transition structure into the rod antenna portion of the antenna assembly with poor efficiency and is mostly reflected back into the waveguide, resulting in a poor pulse echo profile.

Accordingly, it would be advantageous to have an improved dielectric rod antenna assembly having a transition structure that provides for pure $TE_{11}$ propagation with low crosspolarization and maximum attenuation of upper modes. It would also be advantageous to have an improved dielectric rod antenna assembly with efficient coupling between the waveguide and the rod antenna.

BRIEF SUMMARY OF THE INVENTION

The present invention provides an antenna configuration for microwave or radar-based level measurement systems.

In a first aspect, the present invention provides an antenna assembly suitable for use in a level measurement device for measuring the level of a material in a container, the antenna assembly comprising: (a) a rod antenna having a lower end and an upper end; (b) a coupling sleeve defining a tubular passage and including a coupling mechanism for coupling with the container, the coupling sleeve being coupled to the upper end of the rod antenna such that the upper end of the rod antenna closes one end of the tubular passage; and (c) a transition structure extending into the tubular passage, the transition structure including, (i) a waveguide for directing electromagnetic energy into the rod antenna, the waveguide having a top end short-circuited by a rear wall, (ii) a dielectric material filling the interior of the waveguide, the dielectric material having a bottom end located proximate the upper end of the rod antenna and a top end abutting the rear wall, and (iii) an excitation element projecting through the waveguide into the dielectric material for converting electrical energy into electromagnetic wave energy.

In another aspect, the present invention provides a level measurement system for measuring the level of a material in a container, comprising: a controller having a receiver component and a transmitter component; and a transducer for emitting electromagnetic energy and coupling reflected electromagnetic energy, the transducer having an input port operatively coupled to the transmitter component and being responsive to the transmitter component for emitting the electromagnetic energy, and having an output port operatively coupled to the receiver component for outputting reflected electromagnetic energy coupled by the transducer, the receiver component converting the reflected electromagnetic energy into corresponding electrical signals, the controller including a program component for determining the distance travelled by the electromagnetic energy, the transducer including an antenna assembly, including, (a) a rod antenna having a lower end and an upper end; (b) a coupling sleeve defining a tubular passage and including a coupling mechanism for coupling with the container, the coupling sleeve being coupled to the upper end of the rod antenna such that the upper end of the rod antenna closes one end of the tubular passage; and (c) a transition structure extending into the tubular passage, the transition structure including, (i) a waveguide for directing electromagnetic energy into the rod antenna, the waveguide having a top end short-circuited by a rear wall, (ii) a dielectric material filling the interior of the waveguide, the dielectric material having a bottom end located proximate the upper end of the rod antenna and a top end abutting the rear wall, and (iii) an excitation element projecting through the waveguide into the dielectric material for converting electrical energy into electromagnetic wave energy.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Reference will now be made to the accompanying drawings, which show, by way of example, an embodiment of the present invention, and in which.

DETAILED DESCRIPTION OF SPECIFIC EMBODIMENTS

Figure 1:
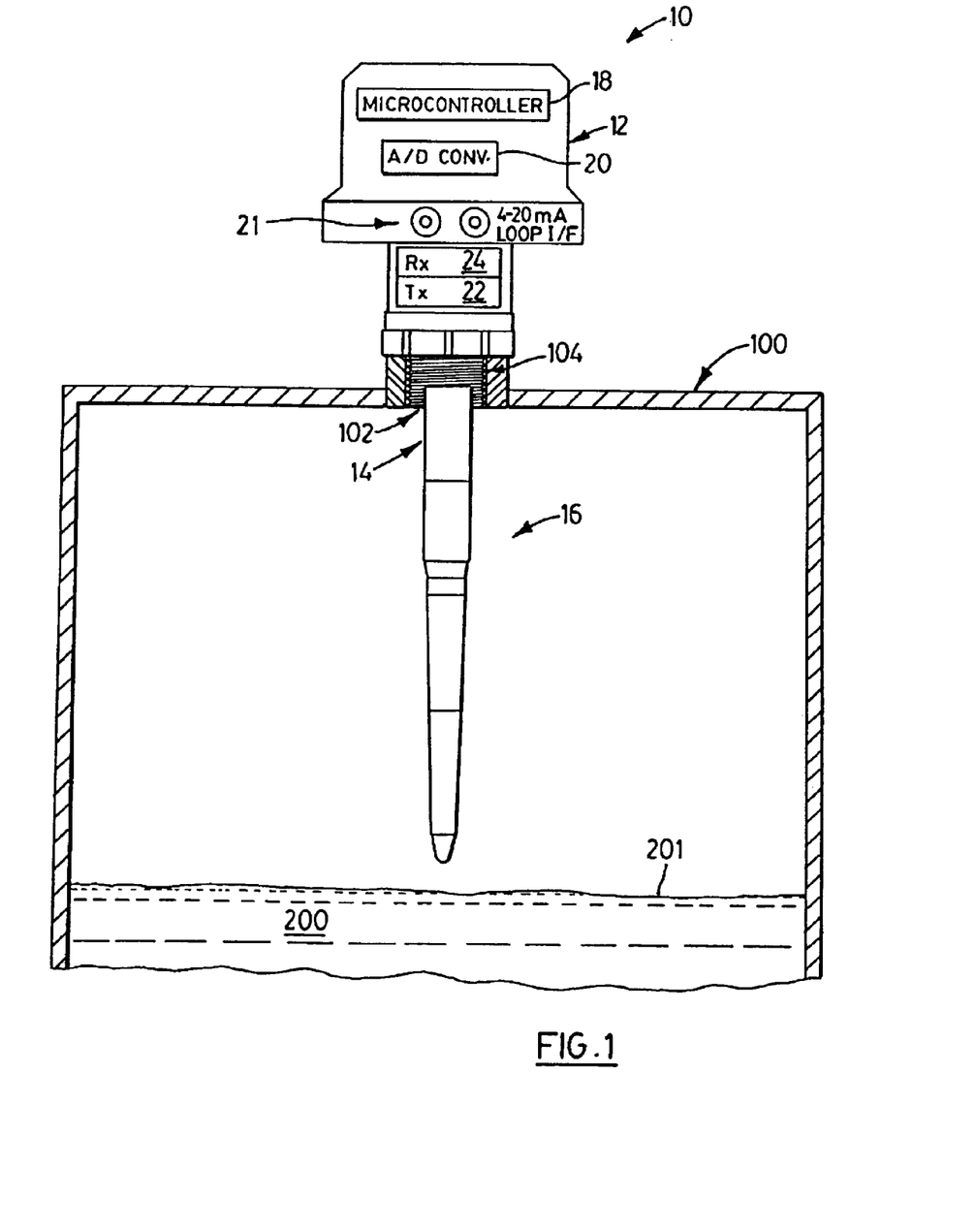
FIG. 1 shows in diagrammatic form a time of flight ranging device utilizing an antenna configuration according to the present invention.

Reference is first made to FIG. 1, which shows in diagrammatic form a level measurement instrument 10 utilizing an antenna configuration according to the present invention.

As shown in FIG. 1, the level measurement instrument 10 is mounted on top of a container 100 which holds a material 200, e.g. liquid, slurry, or solid, and the level measurement instrument 10 is used to determine the level of the material 200 held in the container 100. The container 100 has an opening 102 with a threaded portion 104. The level measurement instrument 10 is coupled, e.g. threaded or screwed, to the threaded portion 104 of the opening 102. The level measurement instrument 10 comprises a housing 12 and a transducer 14. The housing 12 contains electrical/electronic circuitry as described below. The transducer 14 extends into the interior of the container 100 and comprises an antenna assembly 16 in accordance with the present invention.

The level measurement instrument 10 includes a microcontroller unit 18, and an analog-to-digital converter 20. The level measurement instrument 10 may also include a current loop interface (4–20 mA) module 21. The transducer 14 is coupled to the microcontroller 18 through a transmitter 22. The microcontroller 18 uses the transmitter 22 to excite the transducer 14 to emit electromagnetic energy in the form of radar pulses or microwaves. The reflected electromagnetic energy, i.e. reflected radar pulses, are coupled by the transducer 14 and converted into an electric signal by a receiver 24.

The level measurement instrument 10 is installed in the container 100, for example a tank or vessel, containing the material 200, such as a liquid, with a level determined by the top surface of the material 200. The top surface of the material 200 provides a reflective surface or reflector, indicated by reference 201, which reflects the radar pulses generated from the emitter on the transducer 14, i.e. the antenna assembly 16. The reflected radar pulse is coupled by the transducer 14 and converted by the receiver 24 into an electrical signal. The received electrical signal is sampled and digitized by the A/D converter 20 for further processing by the microcontroller 18. The microcontroller 18 executes an algorithm which identifies and verifies the received signal and calculates the range of the reflective surface 201, i.e. the time it takes for the reflected pulse to travel from the reflective surface 201 to the receiver 24 on the transducer 14. From this calculation, the distance to the surface of the material 201 and thereby the level of the material, e.g. liquid 200 in the container 100, is determined. The microcontroller 18 also controls the transmission of data and control signals through the current loop interface 21. The microcontroller 18 is suitably programmed to perform these operations as will be within the understanding of those skilled in the art. These techniques are described in prior patents of which U.S. Pat. No. 4,831,565 and U.S. Pat. No. 5,267,219 are exemplary.

As shown in FIG. 1, the antenna assembly 16 extends from the opening 102 into the interior of the container 100. The antenna assembly 16 is screwed into the threaded portion 104 in the opening 102 of the container 100 and functions as the transducer to provide a combined transmitting and receiving device. The antenna assembly 16 includes an appropriate internal structure, as described below, and transmits electromagnetic signals onto the surface 201 of the material 200 in the container 100. The electromagnetic signal is reflected by the surface 201 of the material 200, and an echo signal is received by the antenna assembly 16. The echo signal is processed as described above to calculate the level of the material 200 in the container 100.

Figure 2:
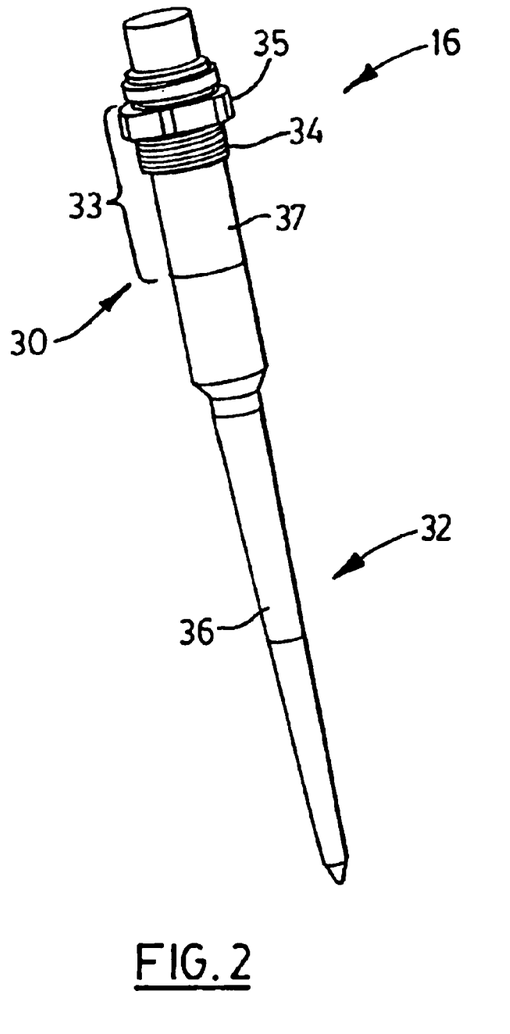
FIG. 2 shows an antenna assembly according to the present invention.

Reference is next made to FIG. 2, which shows in more detail the antenna assembly 16 according to the present invention. The antenna assembly 16 comprises an upper section 30 and a lower section 32. The upper section 30 is coupled to the housing 12 and operatively coupled to a transducer interface in the instrument 10. The lower section 32 comprises a rod antenna 36 which launches the microwave pulses into the container 100 and receives the reflected pulses.

The upper section 30 includes an installation thread 34. Preferably, the installation thread 34 is formed integrally with the upper section 30 of the antenna assembly 16. The installation thread 34 has a pitch and diameter which matches the threaded portion 104 in the opening 102 of the container 100. Advantageously, the integrated installation thread 34 mates with the vessel opening, e.g. screws into the opening, and eliminates the need for an o-ring or gasket to seal the opening. As shown, the antenna assembly 16 may include a threaded nut 35 which is tightened against the opening 102 in the container 100 (as shown in FIG. 1). The upper section also includes a lower tubular portion 37 of a narrower diameter than the installation thread 34, allowing it to be inserted through the opening 102 of the container 100. Collectively, the threaded nut 35, installation thread 34 and lower tubular portion 37 constitute a coupling sleeve 33. Other means of coupling the antenna assembly 16 to the container 100 may be employed, and will be understood by those of ordinary skill in the art.

The antenna assembly 16 is constructed from a chemically resistant polymer which is chosen based on the particular application. Suitable polymers include PTFE, PFA, Polypropylene, Polyethylene.

The antenna configuration according to the present invention may be formed from a single material based on the chemical compatibility of the application, i.e. the material in the vessel. The antenna assembly 16 may be formed as a single unit which is molded as a single unit or one piece with the installation thread. The antenna assembly 16 may also be constructed using individual or discrete polymeric components for the upper section 30 and the installation thread 34, and the lower section 32. The upper 30 and lower 32 section are then welded together using known techniques compatible with the material composition for the components, for example, ultrasonic welding, hot plate welding, and spin welding.

Figure 3:
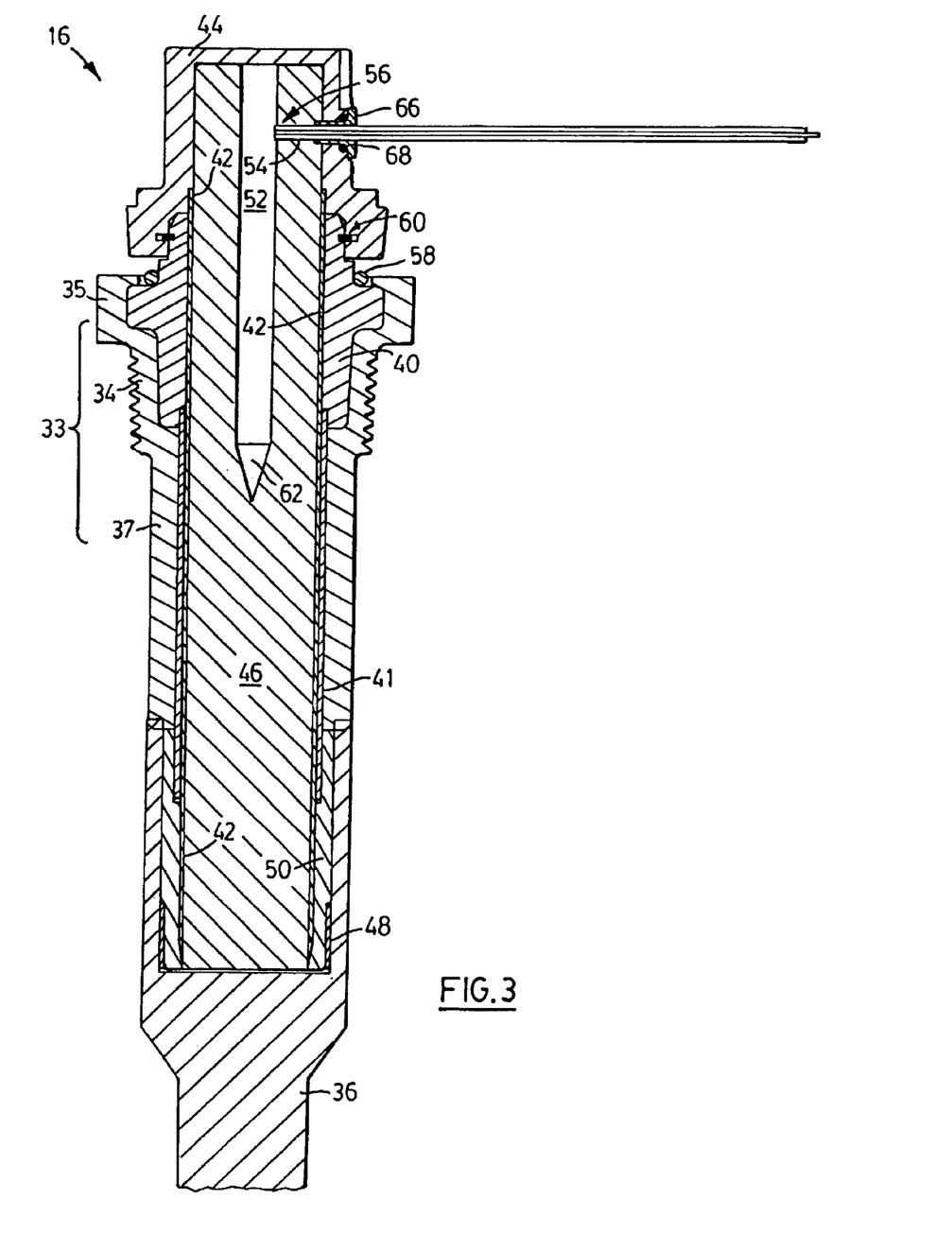
FIG. 3 shows a cross-sectional view of an antenna assembly according to the present invention.
Figure 4:
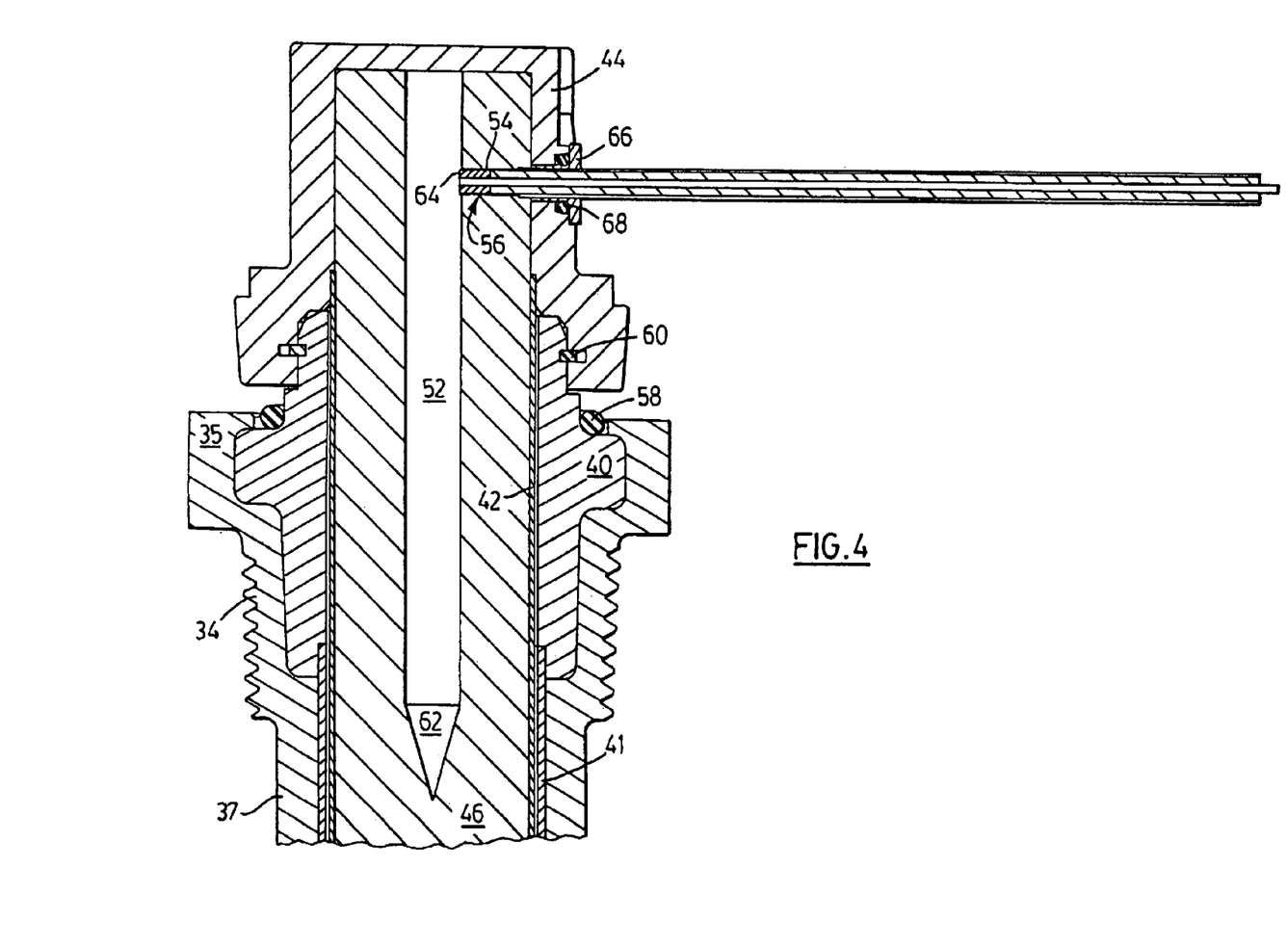
FIG. 4 shows an enlarged view of a portion of the view shown in FIG. 3.

Reference is now made to FIGS. 3 and 4, which show a longitudinal cross-section of the antenna assembly 16 according to the present invention. The coupling sleeve 33 and the rod antenna 36 are shown welded together at the point where the upper end of the rod antenna 36 abuts the bottom edge of the lower tubular portion 37.

The coupling sleeve 33 overmolds a hollow metal liner 40. The metal liner 40 includes a thin metal tube extending downwards beyond the end of the lower tubular portion 37 and upwards beyond the top of the coupling sleeve 33. The upper portion of the metal liner 40 is shaped to snugly fit the interior of the coupling sleeve 33. Coaxial with, and rotatable within, the metal liner 40 is a metal tube 42 having a diameter just slightly smaller than the interior diameter of the metal liner 40. The top end and the bottom end of the metal tube 42 both extend beyond the metal liner 40. The bottom end of the metal tube 42 also extends below the installation thread 34 on the coupling sleeve 33, so as to ensure that there is a shielded length of antenna extending into the container 100 (FIG. 1). In another embodiment, the opening 102 (FIG. 1) includes an outwardly extending pipe or tube at the end of which is the threaded portion 104 (FIG. 1), meaning that a portion of the antenna will be disposed within the pipe or tube and not fully within the container 100. To avoid reflections and directivity problems caused by the tube or pipe, the antenna 16 may be designed such that shielded length of antenna is sufficiently lengthy so as to extend through the opening 102 and part way into the container 100.

Press fitted onto the top end of the metal tube 42 is a can-shaped exciter enclosure 44, which provides a rear wall closing the top end of the metal tube 42. The exciter enclosure 44 and the metal tube 42 form a circular waveguide short-circuited at one end. The metal tube 42 and the exciter enclosure 44 may be made of a suitable material for their application as a waveguide including, but not limited to, brass. The length of the waveguide formed by the metal tube 42 and the exciter enclosure 44 can be determined based upon the desired shielded length of the antenna. The internal diameter of the waveguide maybe determined by the desired bandwidth of the waveguide.

The waveguide is filled with a rod-shaped dielectric material 46. The dielectric material 46 abuts the top end of the exciter enclosure 44 and may extend beyond the lower end of the metal tube 42. The lower end of the dielectric material 46 comes into close proximity with the upper end of the rod antenna 36.

To improve the energy coupling between the dielectric material 46 and the rod antenna 36 and reduce reflections at this interface, a metal ring 48 of a diameter larger than the dielectric material 46 is placed coaxial with the lower end of the dielectric material 46. The metal ring 48 may be a short section of tubular metallic material, such as brass, copper, steel or other suitable material. The coupling for a particular antenna 16 may be optimized by altering the diameter, thickness, length and longitudinal placement of the metal ring 48.

In one embodiment, the metal ring 48 is held in place by a guide tube 50 that is press fitted onto the lower end of the metal liner 40, and is sized to fill a space between the rod antenna 36, the lower tubular portion 37 and the dielectric material 46. The guide tube 50 may be composed of the same material as the rod antenna 36. The metal ring 48 reduces the level of the secondary lobes by increasing the section of the excitation region and reducing the phase front curvature in this region, thereby improving the radiation pattern of the antenna assembly 16. It also increases the coupling between the rod antenna 36 and the dielectric material 46 by improving the efficiency of the conversion of the $TE_{11}$ mode in the waveguide into the $HE_{11}$ mode within the rod antenna 36.

The upper end of the dielectric material 46 features two cavities: a longitudinal bore 52 and a radial bore 54. The longitudinal bore 52 is geometrically centred with respect to the cross-section of the dielectric material 46, i.e. it is coaxial, and it extends from the upper end of the dielectric material 46 part way into the material 46 terminating in a tapered tip 62. The top end of the longitudinal bore 52 is closed off by the exciter enclosure 44. Accordingly, the longitudinal bore 52 results in a dielectrically-lined waveguide. The longitudinal bore 52 improves the microwave characteristics of the antenna assembly 16 by moving the cutoff frequency for the $TM_{01}$ mode above whatever frequency that mode would otherwise propagate at. Thus, it acts as a filter to attenuate $TM_{01}$ frequencies at or below a certain frequency. This still allows the $TE_{11}$ mode to propagate along the longitudinal bore 52 portion of the waveguide as an evanescent wave. The length of the longitudinal bore 52 will affect the extent of attenuation. In one embodiment, the length of the bore 52 is chosen to ensure that the $TM_{01}$ mode is attenuated by 30 dB or more.

At the end of the longitudinal bore 52 the tapered tip 62 ensures a smoother transition from the dielectrically-lined waveguide to the dielectric-filled waveguide. A tapered tip 62 acts so as to reduce reflections and improve the echo profile as compared to a flat end. The length of the tapered tip 62 may be chosen so as to optimize the efficiency of the transition.

The radial bore 54 extends radially from the side of the dielectric material 46 into the longitudinal bore 52. The radial bore 54 is adapted to house an excitation element 56. The excitation element 56 penetrates the exciter enclosure 44 and terminates at or near the end of the radial bore 54, proximate the longitudinal bore 52.

Figure 5:
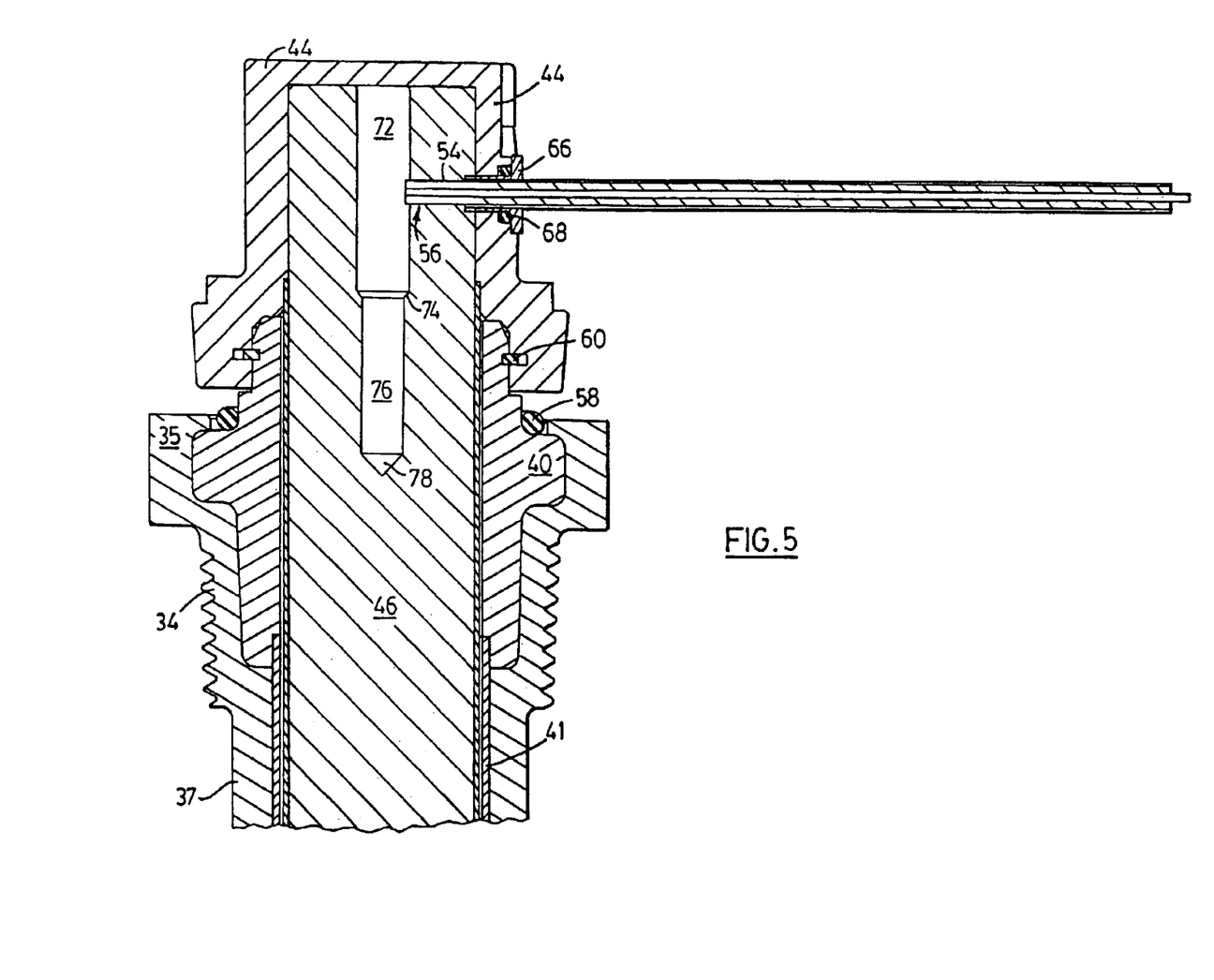
FIG. 5 shows a cross-sectional view of another embodiment of an antenna assembly according to the present invention.

Reference is now made to FIG. 5, which shows an enlarged cross-sectional view of another embodiment of an antenna assembly according to the present invention. As shown in FIG. 5, the upper end of the dielectric material 46 may feature a first bore 72 extending axially from the exciter enclosure 44 into the dielectric material 46 and a second bore 76 coaxial with, but of a smaller diameter than, the first bore 72 extending further into the dielectric material 46. Between the first and second bores 72, 76 and joining their surfaces is a tapered shoulder 74. The second bore 76 terminates in a tapered end 78. With this embodiment, the size and length of the first and second bores 72,74 are chosen such that the reflections from the tapered shoulder 74 are reduced or cancelled by the reflections from the tapered end 78.

Referring again to FIGS. 3 and 4, in one embodiment the antenna 16 is designed to work at 5.8 GHz and 6.3 GHz. With such an example, the internal diameter of the metal tube 42 is 25.0 mm and the dielectric material is a Polypropylene rod. In this arrangement, the cutoff frequency for the $TE_{11}$ mode is 4.7 GHz and the cutoff frequency for the $TM_{01}$ mode is 6.13 GHz. Accordingly, when the antenna 16 is operated at 6.3 GHz the $TM_{01}$ mode is excited in addition to the $TE_{11}$ mode. The diameter of the longitudinal bore 52 is therefore selected so as to move the cutoff frequency for the $TM_{01}$ mode above 6.3 GHz.

Together, the exciter enclosure 44, the metal tube 42, the dielectric material 46 and the excitation element 56 comprise a transition structure. The transition structure may be rotated relative to the metal liner 40, the coupling sleeve 33 and the rod antenna 36. The exciter enclosure 44 and the metal liner 40 are secured together by a spring ring 60. The spring ring 60 fits into a pair of circumferential grooves, one formed in the outer surface of the metal liner 40 and a corresponding one formed in the inner surface of the exciter enclosure 44. With the spring ring 60 in place, the exciter enclosure 44 is firmly coupled to the metal liner 40 but is allowed the freedom to rotate relative to the metal liner 40. By rotating the transition structure, the polarization plane may be altered, which may address performance problems encountered with a particular orientation relative to the container 100 (FIG. 1).

An O-ring seal 58 may be arranged between the exciter enclosure 44 and the metal liner 40 to seal any gap between them. The exciter enclosure 44 may include a plastic sheathing (not shown) thereby thickening its outer wall and bringing it into closer proximity with the metal liner 40 and pressing against the O-ring seal 58 shown in FIGS. 3 and 4.

The excitation element 56 includes a coaxial semi-rigid cable that terminates with a metal disk 64. The metal disk 64 is soldered to the centre conductor of the coaxial cable. A cable mount 66 is press fitted into the exterior of the exciter enclosure 44 for receiving the coaxial cable. The jacket of the coaxial cable is soldered to the cable mount 66 to secure it in place. The portion of the coaxial cable that is within the exciter enclosure 44 does not have a jacket. An O-ring 68 is arranged in a groove within the exterior of exciter enclosure 44 for sealing the cable mount 66 to the exciter enclosure 44.

Figure 6:
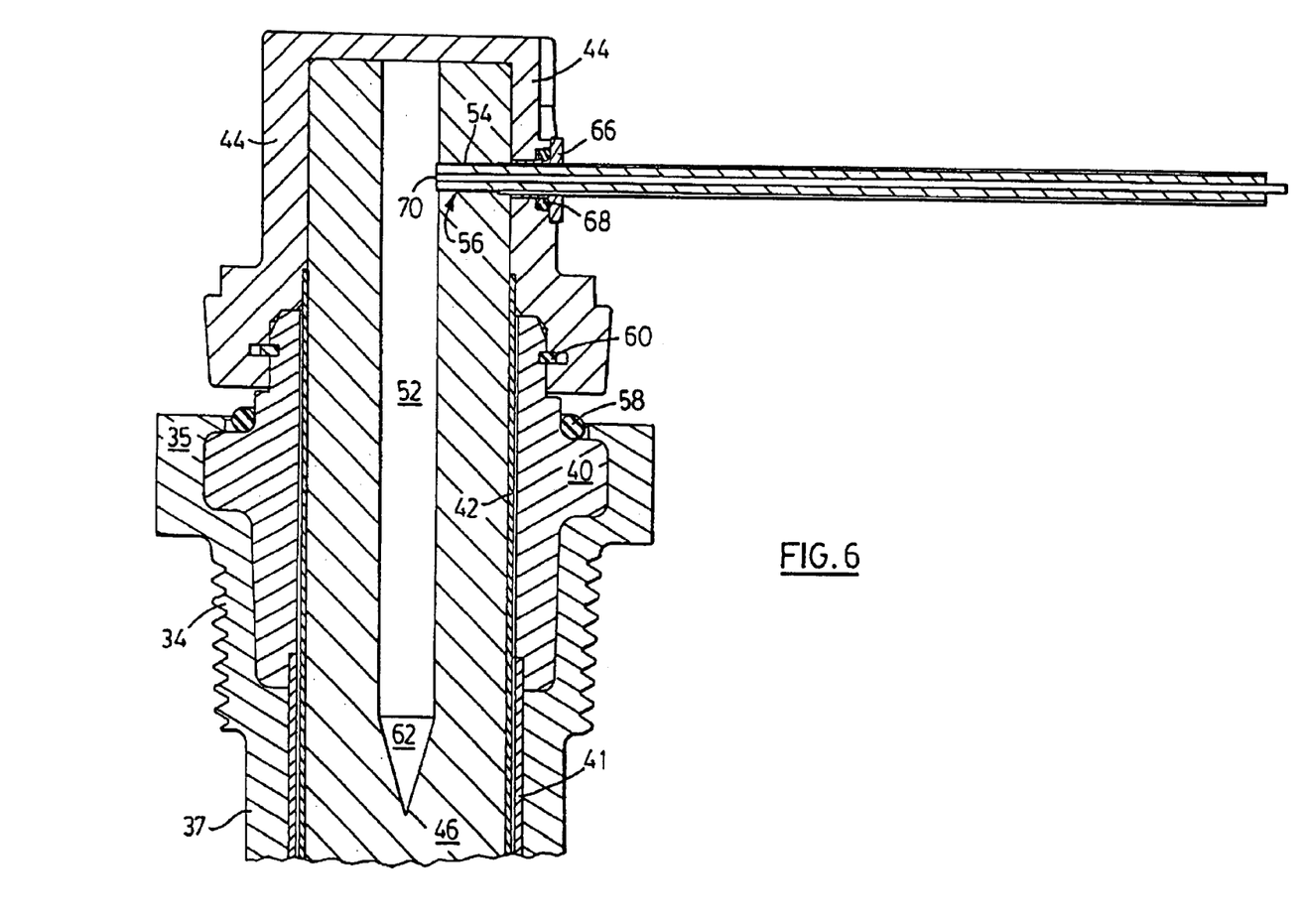
FIG. 6 shows across-sectional view of a further embodiment of an antenna assembly according to the present invention.

Reference is now made to FIG. 6, which shows an enlarged cross-sectional view of a further embodiment of an antenna assembly according to the present invention. In this embodiment, as shown in FIG. 6, the excitation element 56 does not include a metal disk, but rather consists of only the coaxial cable. In this embodiment, the centre conductor 70 of the coaxial cable acts as an exciter.

It will be understood by those of ordinary skill in the art that the above-described embodiments of the present invention may be modified or adapted to accommodate specific applications. For example, although the antenna 16 has been described as having a circular cross-section, other cross-sections may be used for some applications. Moreover, although the longitudinally extending cavity within the dielectric material 46 described in the above-embodiments is a circular longitudinal bore 52, other geometric cross-sections may be used for the longitudinal bore 52, depending upon the application.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An antenna assembly suitable for use in a level measurement device for measuring the level of a material in a container, the antenna assembly comprising:
   (a) a rod antenna having a lower end and an upper end;
   (b) a coupling sleeve defining a tubular passage and including a coupling mechanism for coupling with the container, the coupling sleeve being coupled to the upper end of said rod antenna such that the upper end of said rod antenna closes one end of the tubular passage; and
   (c) a transition structure extending longitudinally into the tubular passage, the transition structure including:
      (i) a waveguide for directing electromagnetic energy into said rod antenna, the waveguide having a top end short-circuited by a rear wall,
      (ii) a dielectric material filling the interior of said waveguide, said dielectric material having a bottom end located proximate the upper end of said rod antenna and a top end abutting the rear wall, and
      (iii) an excitation element projecting through said waveguide into said dielectric material for converting electrical energy into electromagnetic wave energy,
   wherein said dielectric material has a longitudinal axis, and wherein said dielectric material defines a coaxial bore extending longitudinally from the top end into said dielectric material and terminating in a distal end, wherein the coaxial bore is circular in cross-section and includes a tapered conical tip at the distal end.

2. The antenna assembly claimed in claim 1, wherein said excitation element includes a coaxial cable projecting radially through said waveguide and into said dielectric material, and a metal disk connected to the centre conductor of said coaxial cable, said metal disk being located proximate the coaxial bore.

3. The antenna assembly claimed in claim 2, wherein said dielectric material has a radially extending bore in communication with the coaxial bore for accommodating said excitation element.

4. The antenna assembly claimed in claim 3, wherein said transition structure further includes a cap-shaped enclosure press-fit upon the top end of said waveguide, said cap-shaped enclosure providing the rear wall, and wherein said coaxial cable passes through an orifice in said cap-shaped enclosure, said transition structure further including a cable mount for securing said coaxial cable to said cap-shaped enclosure.

5. The antenna assembly claimed in claim 1, wherein said coaxial bore includes a first circular bore proximate the top end in communication with a second circular bore distant from the top end, said first circular bore having a first diameter and said second circular bore having a second diameter, said second diameter being less than said first diameter.

6. The antenna assembly claimed in claim 5, wherein said second circular bore includes the tapered conical lip at its distal end.

7. The antenna assembly claimed in claim 1, wherein said transition structure further includes a cap-shaped enclosure press-fit upon the top end of said waveguide, said cap-shaped enclosure providing the rear wall.

8. The antenna assembly claimed in claim 7, wherein said cap-shaped enclosure is coupled to said coupling sleeve through a spring ring.

9. The antenna assembly claimed in claim 7, further including an o-ring sealing said coupling sleeve and said cap-shaped enclosure.

10. The antenna assembly claimed in claim 7, wherein said transition structure has a longitudinal axis and is rotatable about its longitudinal axis relative to said coupling sleeve.

11. The antenna assembly claimed in claim 1, wherein said dielectric material has a first diameter and the upper end of said rod antenna has a second diameter, and wherein said antenna assembly further includes a metal ring having a diameter larger than the first diameter and smaller than the second diameter, the metal ring being located coaxial with the bottom end of said dielectric material.

12. The antenna assembly claimed in claim 11, wherein said metal ring is a thin tubular metallic element.

13. The antenna assembly claimed in claim 11, further including a guide tube coaxial with the bottom end of the dielectric material for holding the metal ring in position.

14. A level measurement system for measuring the level of a material in a container, comprising:
  a controller having a receiver component and a transmitter component; and
  a transducer for emitting electromagnetic energy and coupling reflected electromagnetic energy, said transducer having an input port operatively coupled to the transmitter component and being responsive to the transmitter component for emitting the electromagnetic energy, and having an output port operatively coupled to the receiver component for outputting reflected electromagnetic energy coupled by said transducer, the receiver component converting the reflected electromagnetic energy into corresponding electrical signals, said controller including a program component for determining the distance travelled by the electromagnetic energy,
  said transducer including an antenna assembly, including,
  (a) a rod antenna having a lower end and an upper end;
  (b) a coupling sleeve defining a tubular passage and including a coupling mechanism for coupling with the container, said coupling sleeve being coupled to the upper end of said rod antenna such that the upper end of said rod antenna closes one end of the tubular passage; and
  (c) a transition structure extending into the tubular passage, said transition structure including:
    (i) a waveguide for directing electromagnetic energy into said rod antenna, the waveguide having a top end short-circuited by a rear wall,
    (ii) a dielectric material filling the interior of said waveguide, said dielectric material having a bottom end located proximate the upper end of said rod antenna and a top end abutting the rear wall, and
    (iii) an excitation element projecting through said waveguide into said dielectric material for converting electrical energy into electromagnetic wave energy,
      wherein said dielectric material has a longitudinal axis, and wherein said dielectric material defines a coaxial bore extending longitudinally from the top end into said dielectric material and terminating in a distal end, and wherein the coaxial bore is circular in cross-section and includes a tapered conical tip at its distal end.

15. The antenna assembly claimed in claim 14, wherein said excitation element includes a coaxial cable projecting radially through said waveguide and into said dielectric material, and a metal disk connected to the centre conductor of said coaxial cable, said metal disk being located proximate the coaxial bore.

16. The antenna assembly claimed in claim 15, wherein said dielectric material has a radially extending bore in communication with the coaxial bore for accommodating said excitation element.

17. The antenna assembly claimed in claim 16, wherein said transition structure further includes a cap-shaped enclosure press-fit upon the top end of said waveguide, said cap-shaped enclosure providing the rear wall, and wherein said coaxial cable passes through an orifice in said cap-shaped enclosure, said transition structure further including a cable mount for securing said coaxial cable go said cap-shaped enclosure.

18. The antenna assembly claimed in claim 14, wherein said coaxial bore includes a first circular bore proximate the top end in communication with a second circular bore distant from the top end, said first circular bore having a first diameter and said second circular bore having a second diameter, said second diameter being less than said first diameter.

19. The antenna assembly claimed in claim 18, wherein said second circular bore includes the tapered conical tip at its distal end.

20. The antenna assembly claimed in claim 14, wherein said transition structure further includes a cap-shaped enclosure press-fit upon the top end of said waveguide, said cap-shaped enclosure providing the rear wall.

21. The antenna assembly claimed in claim 20, wherein said cap-shaped enclosure is coupled to said coupling sleeve through a spring ring.

22. The antenna assembly claimed in claim 20, further including an o-ring sealing said coupling sleeve and said cap-shaped enclosure.

23. The antenna assembly claimed in claim 20, wherein said transition structure has a longitudinal axis and is rotatable about its longitudinal axis relative to said coupling sleeve.

24. The antenna assembly claimed in claim 14, wherein said dielectric material has a first diameter and the upper end of said rod antenna has a second diameter, and wherein said antenna assembly further includes a metal ring having a diameter larger than the first diameter and smeller than the second diameter, the metal ring being located coaxial with the bottom end of said dielectric material.

25. The antenna assembly claimed in claim 24, wherein said metal ring is a thin tubular metallic element.

26. The antenna assembly claimed in claim 24, further including a guide tube coaxial with the bottom end of the dielectric material for holding the metal ring in position.

* * * * *